form Office 3,075,011
Patented Jan. 22, 1963

3,075,011
ETHYLENICALLY UNSATURATED BENZYL
PHOSPHORUS AMIDES
Albert Y. Garner, Earl C. Chapin, and John G. Abramo, Springfield, Mass., assignors to Monsanto Chemical Company, St. Louis, Mo., a corporation of Delaware
No Drawing. Filed Mar. 16, 1960, Ser. No. 15,252
5 Claims. (Cl. 260—551)

This invention relates to novel ethylenically unsaturated benzyl phosphorus compounds. More particularly, it relates to novel vinyl benzyl phosphonamides and phosphinamides.

The technology of phosphorus polymers has heretofore remained relatively undeveloped. However, these polymers are growing increasingly attractive for use in specialized applications wherein their novel properties may be advantageously utilized.

It is an object of this invention to provide novel phosphorus containing vinylidene monomers.

Another object is the provision of novel vinylidene benzyl monomers containing phosphorus amide groups and a process for their manufacture.

A further object is the provision of novel flame-resistant polymers.

These and other objects are attained by contacting an ethylenically unsaturated benzyl phosphorus acid halide of a class as hereinafter described with an amino compound of a class as hereinafter described at a temperature of from −20 to 50° C. under substantially anhydrous conditions.

The following examples are presented in illustration of the invention and are not intended as limitations thereon.

*Example I*

Twenty-four grams (about 0.1 mol) of para-vinyl benzylphosphonyl chloride, which has a structural formula corresponding to:

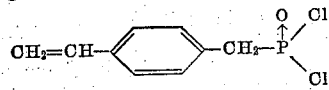

are dissolved in 100 ml. of anhydrous dioxane in a stirred reactor. Anhydrous gaseous ammonia is slowly bubbled into the dioxane solution at room temperature. The reaction temperature is maintained at about room temperature, using an ice bath if necessary, for 2 hours. Crystalline salts formed during the reaction are removed by filtration and the filtrate is subsequently distilled to remove excess ammonia and dioxane solvent. The residue is dissolved in hot (ca. 50° C.) acetone, which solution is then filtered and the filtrate cooled to precipitate crystalline solids which are identified by infrared spectroscopy and elemental analysis as para-vinyl benzylphosphonamide.

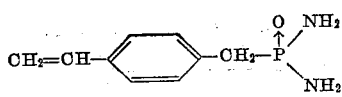

*Example II*

Example I is repeated, substituting 26 grams (about 0.1 mol) of P-methyl para-isopropenyl benzylphosphinyl bromide, which has a structural formula corresponding to

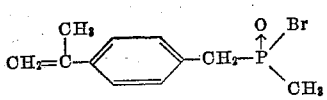

for the para-vinyl benzylphosphonyl chloride employed therein. The crystalline product obtained is identified by infrared spectroscopy and elemental analysis as P-methyl para-vinylbenzylphosphinamide.

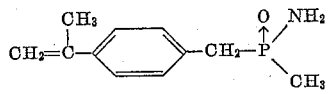

*Example III*

Twenty-four grams (about 0.1 mol) of para-vinyl benzylphosphonyl chloride are slowly added, amid stirring, to 32 grams (about 0.4 mol) of aniline in an open reactor. Substantially anhydrous reactants are employed. The reaction mixture is maintained at about 0° C. during such addition, but subsequently is increased to about 30° C. and maintained thereat until a total reaction time of 3 hours has elapsed. The final reaction mixture is taken up in 100 ml. of ether and the insoluble salts are removed by filtration. The ether solution is evaporated to dryness and the remaining solids are recrystallized from hot acetone. The crystalline product obtained is identified by infrared spectroscopy and elemental analysis as N,N'-diphenyl para-vinylbenzylphosphonamide.

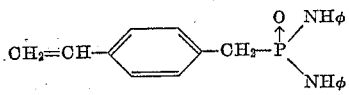

*Example IV*

Twenty-four grams (about 0.1 mol) of para-vinyl benzylphosphonyl chloride are slowly added, amid stirring, to 52 grams (about 0.4 mol) of ditertiarybutylamine in an open reactor. Substantially anhydrous reactants are employed. The reaction mixture is maintained at room temperature throughout such addition and until a total reaction time of 2 hours has elapsed. Crystalline salts are removed from the final reaction mixture by filtration and the filtrate is distilled to remove excess amine. Subsequent vacuum distillation of the residue yields a viscous fluid which is identified by infrared spectroscopy and elemental analysis as N,N,N',N'-tetra-tertiarybutyl para-vinylbenzylphosphonamide.

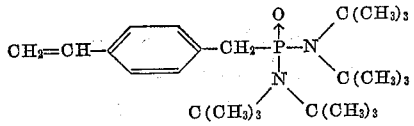

The ethylenically unsaturated benzyl phosphorus acid halides employed in the practice of this invention correspond to the following general formulae:

(a')

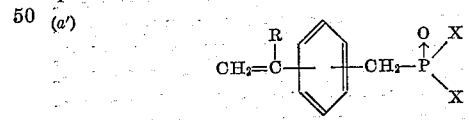

and (b')

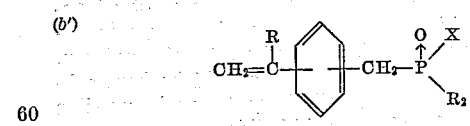

In these formulae, R may be either hydrogen or a methyl radical, X is a halogen radical and $R_2$ is a hydrocarbon radical containing from 1 to 20 carbon atoms.

Therefore, the para-vinyl benzylphosphonyl chloride and the P-methyl para-isopropenyl benzylphosphinyl bromide employed in the examples may be replaced, for example, with one of the following, with equivalent results:

(1) an ethylenically unsaturated benzylphosphonyl halide such as meta-isopropenyl benzylphosphonyl iodide, ortho-vinyl benzylphosphonyl fluoride, para-vinyl benzylphosphonyl bromide, etc., or (2) an ethylenically unsaturated benzylphosphinyl halide such as the homologous series of from P-methyl para-vinyl benzylphosphinyl chloride through P-eicosyl para-vinyl benzylphosphinyl chloride, P-phenyl meta-vinyl benzylphosphinyl bromide, P-naphthyl para-vinyl benzylphosphinyl chloride, P-anthracyl para-isopropenyl benzylphosphinyl chloride, etc.

Such ethylenically unsaturated benzyl phosphorus acid halides may be prepared as described in copending application S.N. 15,278, filed as of instant date.

The amino compounds employed in the practice of this invention correspond to the general formula:

wherein each $R_1$ is an independently selected radical from the group consisting of hydrogen and hydrocarbon radicals containing from 1 to 20 carbon atoms.

Therefore, the ammonia, the aniline and the ditertiary-butylamine employed in the examples may be replaced, for example, with one of the following amino compounds, with equivalent results:

(1) a primary amine such as the homologous series of from methylamine through eicosylamine, 1-amino-naphthalene, 2-amino-naphthalene, 1-amino-anthracene, 2-amino-anthracene, 9-amino-anthracene, etc.;

(2) a secondary amine such as dimethylamine, diethylamine, diisopropylamine, di-n-hexylamine, didodecylamine, dieicosylamine, diphenylamine, etc.; or (3) a mixed secondary amine such as the homologous series of from methylethylamine through eicosylethylamine, the homologous series of from methylphenylamine through eicosylphenylamine, propylisobutylamine, etc. Mixtures of such amino compounds may also be employed.

The novel ethylenically unsaturated benzyl phosphonamides and phosphinamides correspond, respectively, to the general formulae:

(a)
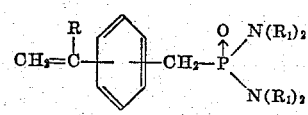

and (b)
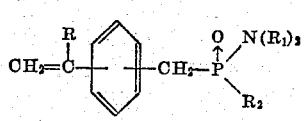

wherein, R, $R_1$ and $R_2$ are radicals as hereinbefore described.

These products are prepared by coreacting an ethylenically unsaturated benzyl phosphorus acid halide (hereinafter referred to as phosphorus acid halide for brevity), of the species heretofore set forth, with one of the foregoing amino compounds or a mixture thereof at a temperature of from −20 to 50° C. When solid phosphorus acid halides are employed, the reaction is most advantageously effected in the presence of an inert organic solvent therefore such as dioxane, ether, tetrahydrofuran, benzene, etc. The reaction system should be kept substantially free of water at all times to avoid possible hydrolysis of the phosphorus acid halide.

Considering the process in greater detail; substantially 1 molar proportion of amino compound is required for each equivalent proportion of halogen groups present in the phosphorus acid halide. However, it is preferred to employ at least twice the required proportion of amino compound, the excess serving as acid acceptor for the halogen halide formed during the reaction. Alternatively, a stoichiometric proportion of an alkali metal, or alkaline earth metal, hydroxide, carbonate or bicarbonate may be employed as acid acceptor. Examples of such include sodium carbonate, sodium bicarbonate, potassium carbonate, lithium hydroxide, calcium carbonate, calcium hydroxide, barium hydroxide, etc.

Gaseous amino compounds should be employed in conjunction with an inert organic solvent of the type heretofore described. The gaseous amino compound may be either predissolved in the solvent or passed into a solution of the phosphorus acid halide in such solvent.

However, wherever possible, it is preferred to add the phosphorus acid halide to the amino compound so that a stoichiometric excess of amino compound may be present at all times during the reaction.

Recovery of the novel ethylenically unsaturated benzyl phosphonamides or phosphinamides from the final reaction mixture may be accomplished employing conventional techniques, e.g., filtration of solid components, recrystallization from solvents, distillation, etc. The particular recovery method employed in each case will be apparent to those skilled in the art having regard to the nature of the particular final reaction mixture of interest.

The products of this invention range from viscous fluids to crystalline solids. As a class, they have been found to be flame-resistant. In one application they may be homopolymerized, or interpolymerized with other vinyl or vinylidene monomers, e.g. styrene, acrylic esters, acrylonitrile, etc., to provide novel flame-resistant polymers. The homopolymers may be cast as flame resistant surface coatings (or laminates) on, e.g., wood, glass, metal, refractories, etc. They are particularly attractive for use in the formulation of intumescent paints. Interpolymers containing minor proportions of the products of this invention will possess substantially the properties of the major component but will be possessed of the added advantage of a high degree of flame-resistance.

*Example V*

Ten grams of the para-vinyl benzylphosphonamide prepared in Example I, 30 grams of styrene and 0.1 gram of ditertiarybutyl peroxide are dissolved in 40 ml. of dioxane and the solution is refluxed under a nitrogen atmosphere for 100 hours. The resulting solution is cooled to about room temperature and then is poured into an excess of methanol to precipitate a styrene interpolymer containing about 25% para-vinyl benzylphosphonamide by weight. Testing for flammability by placing a portion of the polymer in the flame of a Meeker burner until ignited, the polymer is found to be self-extinguishing.

It is obvious that many variations may be made in the products and processes set forth above without departing from the spirit and scope of this invention.

What is claimed is:

1. A compound of a formula selected from the group consisting of:

(a)
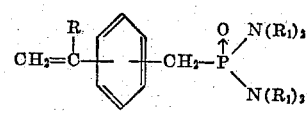

and (b)
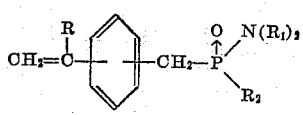

wherein, in each of the above formulae, R is selected from the group consisting of hydrogen and methyl, each $R_1$ is independently selected from the group consisting of hydrogen and hydrocarbon radicals free of ethylenic and acetylenic unsaturation and having from 1 to 20 carbon atoms and $R_2$ is a hydrocarbon radical free of ethylenic and acetylenic unsaturation and having from 1 to 20 carbon atoms.

2. Vinyl benzylphosphonamide.

3. P-methyl vinylbenzylphosphinamide.

4. N,N′-diphenyl vinylbenzylphosphonamide.

5. N,N,N',N' - tetratertiarybutyl vinylbenzylphosphonamide.

References Cited in the file of this patent
UNITED STATES PATENTS

| | | |
|---|---|---|
| 2,642,413 | Coover | June 16, 1953 |
| 2,666,750 | Dickey et al. | Jan. 19, 1954 |
| 2,730,547 | Dye | Jan. 10, 1956 |
| 2,852,550 | Godfrey | Sept. 16, 1958 |
| 2,934,564 | Burg et al. | Apr. 26, 1960 |

OTHER REFERENCES

Bergmann: The Chemistry of Acetylene and Related Compounds, page 80 (1948).

Anisimov et al.: Chemical Abstracts, vol. 50, pages 7076–77 (1956).